United States Patent
Liu et al.

(10) Patent No.: US 12,167,411 B2
(45) Date of Patent: Dec. 10, 2024

(54) ELECTRONIC APPARATUS FOR WIRELESS COMMUNICATION, METHOD AND COMPUTER READABLE STORAGE MEDIUM

(71) Applicant: Sony Group Corporation, Tokyo (JP)

(72) Inventors: Min Liu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 320 days.

(21) Appl. No.: 17/632,239

(22) PCT Filed: Aug. 7, 2020

(86) PCT No.: PCT/CN2020/107687
§ 371 (c)(1),
(2) Date: Feb. 2, 2022

(87) PCT Pub. No.: WO2021/031880
PCT Pub. Date: Feb. 25, 2021

(65) Prior Publication Data
US 2022/0287011 A1    Sep. 8, 2022

(30) Foreign Application Priority Data

Aug. 16, 2019 (CN) .......................... 201910758553.6

(51) Int. Cl.
*H04W 4/00* (2018.01)
*H04L 1/1829* (2023.01)
*H04W 72/23* (2023.01)

(52) U.S. Cl.
CPC ........... *H04W 72/23* (2023.01); *H04L 1/1848* (2013.01)

(58) Field of Classification Search
CPC .... H04W 72/23; H04W 72/20; H04L 1/1848; H04L 1/1822; H04L 1/1825;
(Continued)

(56) References Cited

U.S. PATENT DOCUMENTS

2018/0212742 A1* 7/2018 Takeda ................. H04L 5/0057
2018/0294927 A1   10/2018 Takeda
(Continued)

FOREIGN PATENT DOCUMENTS

CN    106658555 A    5/2017
CN    107431581 A    12/2017
(Continued)

OTHER PUBLICATIONS

Interdigital Inc: "Deactivating HARQ for Non-Terrestrial Networks", 3GPP Draft; R1-1804857, 3rd Generation Partnership Project (3GPP), Mobile Competence Centre ; 650, Route Des Lucioles ; F-06921 Sophia-Antipolis Cedex ; vol. RAN WG1, No. Sanya, China; Apr. 16-Apr. 20, 2018 ( server Apr. 15, 2018), XP051427120.
(Continued)

*Primary Examiner* — Chuong T Ho
(74) *Attorney, Agent, or Firm* — XSENSUS LLP

(57) ABSTRACT

Provided are an electronic apparatus for wireless communication, a method, and a computer readable storage medium. The electronic apparatus comprises: a processing circuit configured to acquire downlink control information from a base station, and to determine, at least on the basis of a first specific field of the downlink control information, whether a feedback mechanism of a hybrid automatic repeat request process has been deactivated, wherein if it is determined that the feedback mechanism of the hybrid automatic repeat request process has been deactivated, a result of verification performed on a data packet is not fed back to the base station.

14 Claims, 9 Drawing Sheets

(58) Field of Classification Search
CPC ... H04L 1/1854; H04L 1/1896; H04L 5/0094; H04L 5/0055; H04L 1/1607; H04L 1/004; H04L 1/1806; H04L 1/1864; H04L 1/1812
USPC .................................................. 370/329, 330
See application file for complete search history.

(56) References Cited

U.S. PATENT DOCUMENTS

| | | | |
|---|---|---|---|
| 2019/0207662 A1 | 7/2019 | Zhou | |
| 2019/0215810 A1 | 7/2019 | Mu | |
| 2020/0367265 A1* | 11/2020 | Wang | H04L 1/1854 |
| 2020/0396760 A1* | 12/2020 | Yi | H04L 1/1812 |
| 2021/0029679 A1* | 1/2021 | Si | H04L 1/1685 |
| 2021/0105126 A1* | 4/2021 | Yi | H04L 1/1671 |
| 2022/0007404 A1* | 1/2022 | Gou | H04L 1/1854 |
| 2022/0200744 A1* | 6/2022 | Xing | H04L 1/1854 |
| 2022/0263608 A1* | 8/2022 | Wei | H04W 72/23 |

FOREIGN PATENT DOCUMENTS

| | | |
|---|---|---|
| CN | 111756495 A | 10/2020 |
| EP | 1909425 A1 | 4/2008 |

OTHER PUBLICATIONS

International Search Report and Written Opinion mailed on Nov. 10, 2020, received for PCT Application PCT/CN2020/107687, Filed on Aug. 7, 2020, 12 pages including English Translation.
Catt, "HARQ Consideration for NTN", 3GPP TSG RAN WG1 Meeting #97, R1-1906326, May 13-17, 2019, 3 pages.
Ericsson, "On Switching off HARQ for NTN", 3GPP TSG-RAN WG2 #106, R2-1907297, May 13-17, 2019, 7 pages.
Mediatek Inc., "Delay-Tolerant Re-Transmission Mechanisms in NR-NTN", 3GPP TSG RAN WG1 Meeting #97, R1-1906466, May 13-17, 2019, 7 pages.
Mediatek Inc., "Summary for More Delay-Tolerant Re-Transmission Mechanisms in NR-NTN", 3GPP TSG RAN WG1 Meeting #97, R1-1907757, May 13-17, 2019, 9 pages.
Sony, "Consideration on Delay-Tolerant HARQ for NTN", 3GPP TSG RAN WG1 Meeting #96b, R1-1904242, Apr. 8-12, 2019, 3 pages.
Sony, "Discussion on Delay-Tolerant HARQ for NTN", 3GPP TSG RAN WG1 Meeting #98bis, R1-1910748, Oct. 14-20, 2019, 6 pages.
Sony, "Discussion on Delay-Tolerant HARQ for NTN", 3GPP TSG RAN WG1 Meeting #99, R1-1912349, Nov. 18-22, 2019, 6 pages.
Interdigital Inc: "Deactivating HARQ for Non-Terrestrial Networks", 3GPP Draft; R1-1804857, 3RD Generation Partnership Project (3GPP), Mobile Competence Centre ; 650, Route Des Lucioles ; F-06921 Sophia-Antipolis Cedex ; vol. RAN WG1, No. Sanya, China; Apr. 16, 2018-Apr. 20, 2018 ( server Apr. 15, 2018), XP051427120.

* cited by examiner

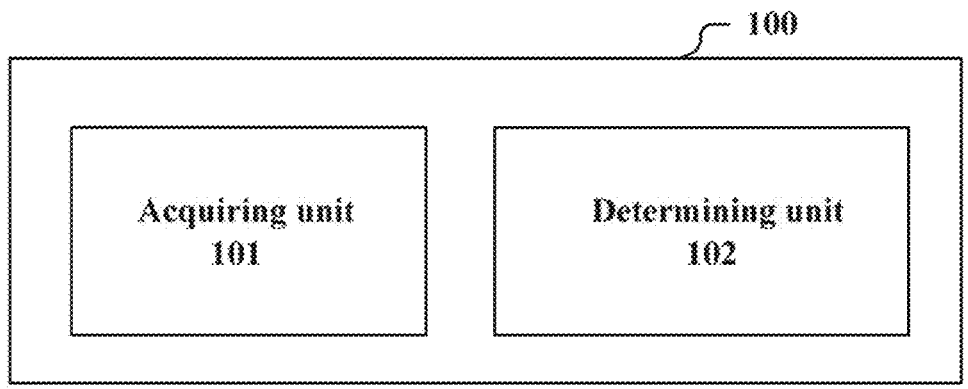

Figure 1

| PDSCH-to-HARQ_feedback timing indicator | | | Number of slots k |
|---|---|---|---|
| 1 bit | 2 bits | 3 bits | |
| '0' | '00' | '000' | 1st value provided by *dl-DataToUL-ACK* |
| '1' | '01' | '001' | 2nd value provided by *dl-DataToUL-ACK* |
| | '10' | '010' | 3rd value provided by *dl-DataToUL-ACK* |
| | '11' | '011' | 4th value provided by *dl-DataToUL-ACK* |
| | | '100' | 5th value provided by *dl-DataToUL-ACK* |
| | | '101' | 6th value provided by *dl-DataToUL-ACK* |
| | | '110' | 7th value provided by *dl-DataToUL-ACK* |
| | | '111' | 8th value provided by *dl-DataToUL-ACK* |

Figure 2

| PDSCH-to-HARQ_feedback timing indicator | | | Number of slots k |
|---|---|---|---|
| 1 bit | 2 bits | 3 bits | |
| '0' | '00' | '000' | Reserved state for HARQ disabling |
| '1' | '01' | '001' | $1^{st}$ value provided by dl-DataToUL-ACK |
| | '10' | '010' | $2^{nd}$ value provided by dl-DataToUL-ACK |
| | '11' | '011' | $3^{rd}$ value provided by dl-DataToUL-ACK |
| | | '100' | $4^{th}$ value provided by dl-DataToUL-ACK |
| | | '101' | $5^{th}$ value provided by dl-DataToUL-ACK |
| | | '110' | $6^{th}$ value provided by dl-DataToUL-ACK |
| | | '111' | $7^{th}$ value provided by dl-DataToUL-ACK |

Figure 3

| PDSCH-to-HARQ_feedback timing indicator | | | Number of slots k | |
|---|---|---|---|---|
| 1 bit | 2 bits | 3 bits | | |
| '0' | '00' | '000' | Reserved state for HARQ disabling and reference value | 16 slots |
| '1' | '01' | '001' | $1^{st}$ value provided by dl-DataToUL-ACK | {0~15} slots |
| | '10' | '010' | $2^{nd}$ value provided by dl-DataToUL-ACK | {0~15} slots |
| | '11' | '011' | $3^{rd}$ value provided by dl-DataToUL-ACK | {0~15} slots |
| | | '100' | $4^{th}$ value provided by dl-DataToUL-ACK | {0~15} slots |
| | | '101' | $5^{th}$ value provided by dl-DataToUL-ACK | {0~15} slots |
| | | '110' | $6^{th}$ value provided by dl-DataToUL-ACK | {0~15} slots |
| | | '111' | $7^{th}$ value provided by dl-DataToUL-ACK | {0~15} slots |

Figure 4

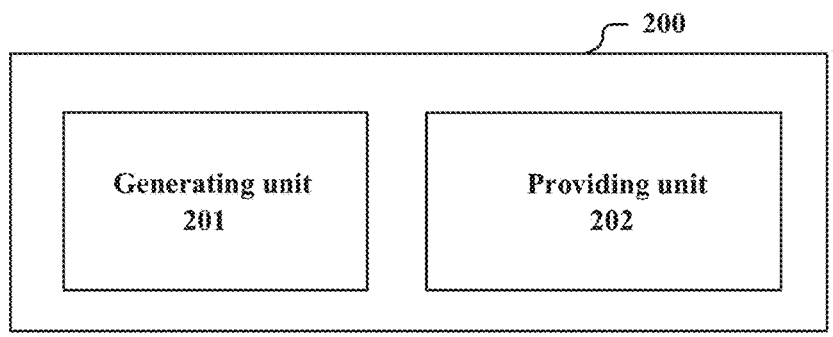

Figure 5

ELECTRONIC APPARATUS FOR WIRELESS COMMUNICATION, METHOD AND COMPUTER READABLE STORAGE MEDIUM

CROSS-REFERENCE TO RELATED APPLICATIONS

The present application is based on filing PCT/CN2020/107687, filed Aug. 7, 2020, and claims priority to Chinese Patent Application No. 201910758553.6, titled "ELECTRONIC DEVICE FOR WIRELESS COMMUNICATION, METHOD AND COMPUTER READABLE STORAGE MEDIUM", filed on Aug. 16, 2019 with the China National Intellectual Property Administration (CNIPA), each of which is incorporated herein by reference in its entirety.

FIELD

The present disclosure relates to the technical field of wireless communications, and in particular to hybrid automatic repeat request technology in a wireless communication system. More particularly, the present disclosure relates to an electronic device and a method for wireless communications, and a computer readable storage medium.

BACKGROUND

In the 3rd Generation Partnership Project (3GPP), it is proposed that satellite communication is the best (or even the unique) choice for backhaul communication in scenarios such as aircraft communications, ships and remote areas, and it is recommended that capabilities of satellites should be made full use of. In most cases, a satellite communication network referred to as a Non-Terrestrial Network (NTN) is predicted to be an important part of the sixth generation mobile communication system. The satellite communication network and a future terrestrial network would form an integrated seamless network. Therefore, the satellite communication and network technology draws much interest in academia and industry.

Hybrid Automatic Repeat Request (HARQ) technology is a combination of Forward Error Correction (FEC) with Automatic Repeat Request (ARQ). A receiver detects whether a received data packet is incorrect through Cyclic Redundancy Check (CRC). If the data packet is correct, the receiver transmits a positive Acknowledgement (ACK) to a transmitter. The transmitter, upon receiving the ACK, then transmits a next data packet. If the data packet is incorrect, the receiver saves the data packet in HARQ buffer and transmits a Negative Acknowledgement (NACK) to the transmitter. The receiver, upon receiving the NACK, retransmits the same data. The receiver merges the data stored in the HARQ buffer with the subsequently received data, and then performs CRC on the merged data. If it still fails, the process of "requesting retransmission and performing soft merging" is repeated. In HARQ, data is transmitted using stop-and-wait process. That is, the transmitter waits for an acknowledgement after transmitting a Transmission Block (TB), and performs a next action after receiving feedback. In addition, in order to improve the efficiency of the system, a concept of HARQ process is introduced. That is, when an acknowledgement is waited for in a HARQ process, the transmitter may continue transmitting data in another HARQ process. At present, a maximum of 16 HARQ processes are supported in 5G NR.

For example, in an NTN, due to the increase of a Round-Trip Delay (RTD) between a base station and a terrestrial user, the use of HARQ would reduce the efficiency of the system. Therefore, the HARQ technology that runs well in a terrestrial network is no longer generally applicable to the NTN.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic device for wireless communications is provided. The electronic device includes processing circuitry. The processing circuitry is configured to: acquire Downlink Control Information from a base station; and determine, at least based on a first particular field of the Downlink Control Information, whether a feedback mechanism of a Hybrid Automatic Repeat Request process is disabled. In a case of determining that the feedback mechanism of the Hybrid Automatic Repeat Request process is disabled, a check result for a data packet is not fed back to the base station.

According to another aspect of the present disclosure, a method for wireless communications is provided. The method includes: acquiring Downlink Control Information from a base station; and determining, at least based on a first particular field of the Downlink Control Information, whether a feedback mechanism of a Hybrid Automatic Repeat Request process is disabled. In a case of determining that the feedback mechanism of the Hybrid Automatic Repeat Request process is disabled; a check result for a data packet is not fed back to the base station.

According to an aspect of the present disclosure, an electronic device for wireless communications is provided. The electronic device includes processing circuitry. The processing circuitry is configured to: generate Downlink Control Information, the Downlink Control Information including at least a first particular field for indicating whether to disable a feedback mechanism of a Hybrid Automatic Repeat Request process; and provide the Downlink Control Information to user equipment. In a case of disabling the feedback mechanism of the Hybrid Automatic Repeat Request process, the user equipment does not feed a check result for a data packet back to a base station.

According to an aspect of the present disclosure, a method for wireless communications is provided. The method includes: generating Downlink Control Information, the Downlink Control Information including at least a first particular field for indicating whether to disable a feedback mechanism of a Hybrid Automatic Repeat Request process; and providing the Downlink Control Information to user equipment. In a case of disabling the feedback mechanism of the Hybrid Automatic Repeat Request process, the user equipment does not feed a check result for a data packet back to a base station.

With the electronic device and the method according to the present disclosure, the feedback mechanism of the Hybrid Automatic Repeat Request process is dynamically enabled and disabled, which realizes flexible control based on the data packet, thereby improving the efficiency of the system.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 1 is a block diagram showing functional modules of an electronic device for wireless communications according to an embodiment of the present disclosure;

FIG. 2 shows an example of a mapping relationship between PDSCH-to-HARQ_feedback timing indicator and the number of slots;

FIG. 3 shows another example of a mapping relationship between PDSCH-to-HARQ_feedback timing indicator and the number of slots;

FIG. 4 shows another example of a mapping relationship between PDSCH-to-HARQ_feedback timing indicator and the number of slots;

FIG. 5 is a block diagram showing functional modules of an electronic device for wireless communications according to another embodiment of the present disclosure;

DETAILED DESCRIPTION OF EMBODIMENTS

Figure 6:
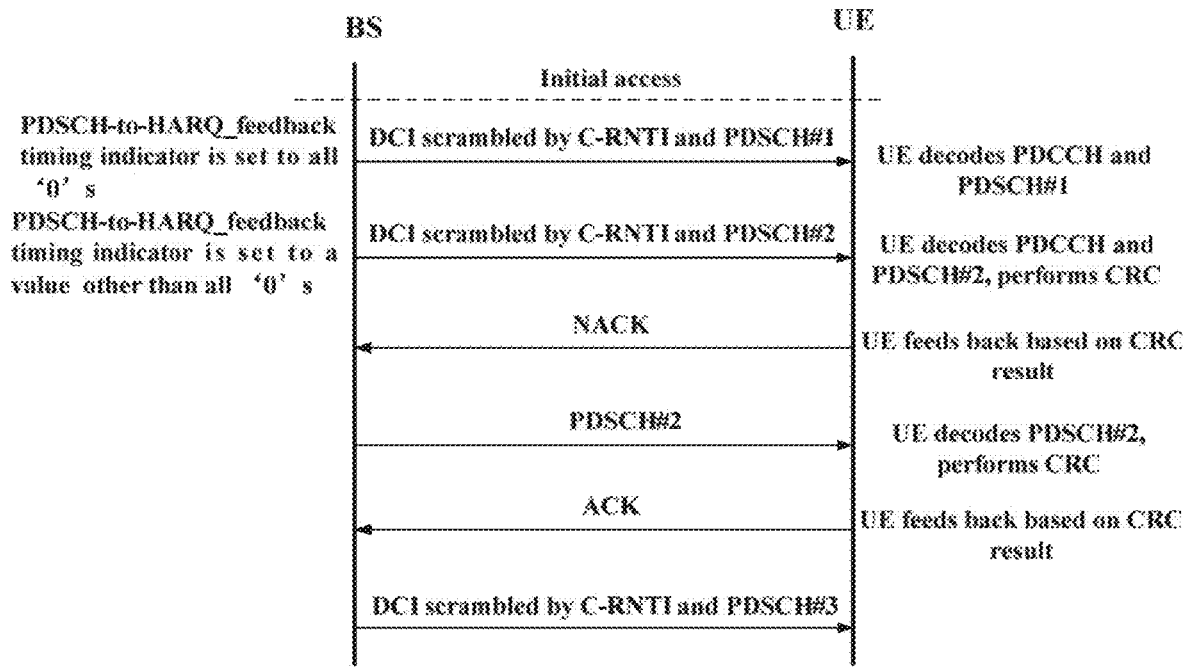
FIG. 6 shows an example of an information procedure between a base station and user equipment.

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As described above, for example, in a scenario with large RTD such as NTN, the conventional HARQ feedback mechanism results in low system efficiency. Therefore, an objective of the present disclosure is to provide a solution for flexibly controlling the HARQ feedback mechanism, to improve the system efficiency while ensuring the reliability of the system. It should be understood that although the NTN is taken as an example of a scenario above, the application scenario of the technical solution according to the present disclosure is not limited thereto, and the technical solution according to the present disclosure is properly applicable to any scenario where a flexible HARQ feedback mechanism is required.

FIG. 1 is a block diagram showing functional modules of an electronic device 100 for wireless communications according to an embodiment of the present disclosure. As shown in FIG. 1, the electronic device 100 includes an acquiring unit 101 and a determining unit 102. The acquiring unit 101 is configured to acquire Downlink Control Information (DCI) from a base station. The determining unit 102 is configured to determine, at least based on a first particular field of the DCI, whether a feedback mechanism of a Hybrid Automatic Repeat Request (HARQ) process is disabled. In a case of determining that the feedback mechanism of the HARQ process is disabled, a check result for a data packet is not fed back to the base station.

The acquiring unit 101 and the determining unit 102 may be implemented by one or more processing circuitries. The processing circuitry may be implemented as, for example, a chip. In addition, it should be understood that various functional units in the device shown in FIG. 1 are logical modules divided based on functions implemented by these functional units, and are not intended to limit specific implementations.

The electronic device 100 may be arranged at a side of the user equipment (UE) or may be communicatively connected to the UE. Here it should be pointed out that the electronic device 100 may be implemented at a chip level or a device level. For example, the electronic device 100 may serve as the user equipment itself and further include external devices such as a memory and a transceiver (which are not shown in the drawings). The memory may be configured to store programs to be executed and related data information required for the user equipment to implement various functions. The transceiver may include one or more communication interfaces to support communications with various devices (for example, a base station, other user equipment and the like). Implementations of the transceiver are not limited herein, which is also applicable to other configuration examples of electronic devices arranged at a side of the user equipment described subsequently.

In addition, it should be noted that the first, the second and the like in the present disclosure are only used for distinction, and do not imply any meaning of order.

In the embodiment, the HARQ feedback mechanism is enabled or disabled based on DCI, and data packet-level control can be realized. For example, the HARQ feedback mechanism can be enabled or disabled dynamically based on a size of RFD, data service requirements, specific communication procedures and the like, thereby improving flexibility and the system efficiency.

In a case that multiple HARQ processes are configured for the UE, the HARQ feedback mechanism is disabled or enabled for one of the HARQ processes (for example, identified by a HARQ process sequence number). That is, the feedback mechanism of each HARQ process may be dynamically enabled or disabled separately.

It should be noted that when the HARQ feedback mechanism is disabled, the possibility of performing blind transmission using the HARQ is not ruled out to ensure the reliability of the system. Blind transmission using the HARQ refers to that a transmitter transmits the same data repeatedly for multiple times in a certain time period, without waiting for feedback from a receiver. The receiver soft merges the data packets received for multiple times during the time period without checking and feeding back for each data packet.

In addition, in the embodiment of the present disclosure, the action of the user equipment itself is not limited. For example, when the feedback mechanism of an HARQ process is disabled, the user equipment as the receiver may empty an HARQ buffer of the corresponding HARQ process to reduce a storage pressure. Alternatively, the user equipment may keep the original data in the HARQ buffer of the HARQ process to combine data transmitted for multiple times during retransmission, so as to improve the reliability. On the other hand, when the feedback mechanism of the HARQ process is disabled, the user equipment may check the data packet without feeding a check result back to the base station, or do not check the data packet, which depends on the specific implementation.

For example, a first particular field of the DCI is set for indicating whether the feedback mechanism of the HARQ process is disabled, and the first particular field is selected so that the HARQ blind transmission is still supported when the feedback mechanism of the HARQ process is disabled. For example, the determining unit 101 is configured to determine that the feedback mechanism of the HARQ process is disabled when determining that the first particular field takes a particular value. The particular value may be any predetermined value, for example, a value of all '0's or all '1's.

Exemplarily, the determining unit 102 may parse a meaning of the first particular field based on radio resource control (RRC) signaling so as to perform the determining. In other words, the base station notifies, trough the RRC signaling, the user equipment of one or more of: whether to dynamically enable or disable the feedback mechanism of the HARQ process or not, and what is the value of the first particular field for indicating that the feedback mechanism of the HARQ process is disabled.

Alternatively, the determining unit 102 may parse a meaning of the first particular field based on inherent configuration. For example, in the case that the feedback mechanism of the HARQ process is to be dynamically enabled or disabled, the specific value of the first particular field for determining that the feedback mechanism of the HARQ process is disabled is written in the user equipment at the factory.

As an example, the first particular field may be a PDSCH-to-HARQ_feedback timing indicator. The field is an existing field in the DCI. In scheduling of 5G NR, fix each HARQ process, feedback time of ACK/NACK for the HARQ process is dynamically indicated by a PDSCH-to-HARQ_feedback timing indicator in DCI corresponding to the HARQ process. For example, in a case that the LE is continuously scheduled to receive two PDSCHs, HARQ feedback time for a first PDSCH (corresponding to HARQ process #1) is determined by a PDSCH-to-HARQ_feedback timing indicator in DCI for scheduling the first PDSCH, and HARQ_feedback time for a second PDSCH (corresponding to HARQ process #2) is determined by a PDSCH-to-HARQ_feedback timing indicator in DCI for scheduling the second PDSCH.

For example, for a DCI format 1_0, a value of the PDSCH-to-HARQ_feedback timing indicator field is mapped to a list {1, 2, 3, 4, 5, 6, 7, 8}. For a DCI format 1_1, a value of the PDSCH-to-HARQ_feedback timing indicator field is mapped to values of a group of number of slots (k) provided by a high-level parameter dl-DataToUL-ACK, as shown in FIG. 2. dl-DataToUL-ACK represents a list of timing for transmitting ACK/NACK.

For example, the user equipment receives a PDSCH in an nth slot. If the PDSCH-to-HARQ_feedback timing indicator is mapped to a value of k, the user equipment feeds back a check result for the PDSCH such as ACK or NACK, in an (n+k)th slot.

In the example, if the PDSCH-to-HARQ_feedback timing indicator takes a particular value such as a value all '0's or all '1's (which is not limited), the PDSCH-to-HARQ_feedback timing indicator indicates that the feedback mechanism of the HARQ process is disabled rather than indicating HARQ feedback time, and the user equipment does not perform ACK/NACK feedback.

For example, the determining unit 102 may determine a meaning of the first particular field based on the parameter dl-DataToUL-ACK in the RRC signaling. The dl-DataToUL-ACK reserves a state for indicating that the feedback mechanism of the HARQ process is disabled when the first particular field takes a particular value.

FIG. 3 shows an example of a mapping relationship between the first particular field and the number of slots in a case that the first particular field is the PDSCH-to-HARQ_feedback timing indicator. It can be seen that in the example, an example of the particular value is all '0's. In a case that the value of the PDSCH-to-HARQ_feedback timing indicator is all '0's, the PDSCH-to-HARQ_feedback timing indicator is mapped to the reserved state of dl-DataToUL-ACK, for indicating that the feedback mechanism of the HARQ process is disabled. In a case that the value of PDSCH-to-HARQ_feedback timing indicator is other than all '0's, the number of slots to be delayed is among different numbers of slots corresponding to other states of di-DataToUL-ACK to which the PDSCH-to-HARQ_feedback timing indicator is mapped.

In addition, the reserved state of the di-DataToUL-ACK may further be used for indicating a reference value of the first particular field when the feedback mechanism of the HARQ process is enabled. The reference value is used for supplementing the meaning of the first particular field when the feedback mechanism of the HARQ process is enabled.

In a case that the first particular field is the PDSCH-to-HARQ_feedback timing indicator, the reference value is a reference number of slots. When the number of slots for feedback is calculated, the reference value is added to the number of slots to which the first particular field is mapped, FIG. 4 shows another example of the mapping relationship between the PDSCH-to-HARQ_feedback timing indicator and the number of slots. In the example, an example of the particular value is all '0's. In a case that the value of the PDSCH-to-HARQ_feedback timing indicator is all '0's, the PDSCH-to-HARQ_feedback timing indicator is mapped to the reserved state of dl-DataToUL-ACK, for indicating that the feedback mechanism of the HARQ process is disabled. In addition, the reserved state further indicates the reference value of the PDSCH-to-HARQ_feedback timing indicator. In a case that the value of the PDSCH-to-HARQ_feedback timing indicator includes is other than all '0's, the number of slots to be actually delayed is equal to a sum of one of different numbers of slots corresponding to other states of dl-DataToUL-ACK to which the PDSCH-to-HARQ_feedback timing indicator is mapped and the reference value.

The reference value, for example, may be calculated based on a minimum distance for a satellite beam arriving at the ground. Specifically, assuming that the minimum distance for the satellite beam arriving at the ground is represented by d, in a transparent architecture, a shortest distance represented by d' is d'=2*d, and in a regenerative architecture, d'=d. The light speed is represented by c, and the sub carrier spacing (SCS) is equal to 15 KHz*$2^k$ (k=0, 1, 2, 3, 4). The reference value of the number of slots is calculated according to the following equation:

$$\text{reference value} = \frac{d'}{c} \times 2^k. \quad (1)$$

In the example shown in FIG. 4, the reference value is equal to 16. Assuming that the value of the PDSCH-to-HARQ_feedback timing indicator takes the value of "001" and the number of slots k corresponding to the state "001" is 10, if the user equipment receives a. PDSCH at slot n, the user equipment transmits ACK or NACK for feedback at slot n+26 (that is, n+10+16).

In addition, the above reference value may further serve as a reference value of the PDSCH-to-HARQ_feedback timing indicator indicated by the DCI format 1_0. For example, the value of the PDSCH-to-HARQ_feedback timing indicator field is mapped to 7 in the list {1, 2, 3, 4, 5, 6, 7, 8}, so that if the user equipment receives a PDSCH at slot n, the user equipment transmits ACK or NACK for feedback at slot n+17 (that is, n+10+7).

The electronic device 100 according to the embodiment is further capable of dynamically enabling or disabling a feedback mechanism of an HARQ process of semi-persistent scheduling (SPS) data. For example, the first particular field may be included in DCI for semi-persistent scheduling (SPS) activation or release to enable or disable the feedback mechanism of the HARQ process of the semi-static scheduling data. An example is given below with reference to FIG. 7.

In addition, in a case of determining that the first particular field does not exist or is default, the determining unit 102 may determine whether the feedback mechanism of the HARQ process is disabled based on the value of the reserved state of the dl-DataToUL-ACK. For example, in a case that the value of the reserved state is equal to 0 or less than a particular value, the determining unit 102 determines that the feedback mechanism of the HARQ process is disabled. The particular value, for example, may be indicated to the user equipment by the base station through RRC signaling. Alternatively, the particular value may be default. In this way, the feedback mechanism of the HARQ process can be enabled or disabled semi-statically through the RRC signaling.

As another example, the determining unit 102 may determine whether the feedback mechanism of the HARQ process is disabled based on a combination of the first particular field and another particular field. For example, in a case of determining that a value of the combination meets a predetermined condition, the determining unit 102 determines that the feedback mechanism of the HARQ process is disabled.

For example, the first particular field is a PDSCH-to-HARQ_feedback timing indicator, and the other particular field may include one or more of: a PUCCH resource indicator and a TPC command for scheduled PUCCH.

In a case that the combination includes the PDSCH-to-HARQ_feedback timing indicator, the PUCCH resource indicator and the TPC command for scheduled PUCCH, for example, the predetermined condition may include one of: a value of each field in the combination being all '0's; a value of each field in the combination being all '1's; each of values of some fields in the combination being all '0's, and each of values of the other fields in the combination being all '1's. It should be noted that the predetermined condition described herein is only an example and an applicable predetermined condition is not limited thereto.

By indicating whether the feedback mechanism of the HARQ process is disabled using the combination of fields, reliability can be further improved.

In the embodiment, dynamic enabling/disabling and/or semi-static enabling/disabling of the feedback mechanism of the HARQ process can be realized without additional signaling overhead, which improves control flexibility, thereby improving the efficiency of the system. In addition, with the solution according to the embodiment, HARQ blind transmission is supported when the feedback mechanism of the HARQ process is disabled, thereby ensuring the reliability of the system.

Second Embodiment

FIG. 5 is a block diagram showing functional modules of an electronic device 200 for wireless communications according to another embodiment of the present disclosure. As shown in FIG. 5, the electronic device 200 includes a generating unit 201 and a providing unit 202. The generating unit 201 is configured to generate DCI. The DCI includes at least a first particular field for indicating whether to disable a feedback mechanism of an HARQ process. The providing unit 202 is configured to provide the DCI to user equipment. In a case of disabling the feedback mechanism of the HARQ process, the user equipment does not feed a check result for a data packet back to a base station.

The generating unit 201 and the providing unit 202 may be implemented by one or more processing circuitries. The processing circuitry may be implemented as, for example, a chip. In addition, it should be understood that various functional units in the device shown in FIG. 5 are logical modules divided based on functions implemented by these functional units, and are not intended to limit specific implementations.

The electronic device 200 may be arranged at a side of the base station or may be communicatively connected to the base station. Here it should be pointed out that the electronic device 200 may be implemented at a chip level or a device level. For example, the electronic device 200 may serve as the base station itself and further include external devices such as a memory and a transceiver (which are not shown in the drawings). The memory may be configured to store programs to be executed and related data information required for the base station to implement various functions. The transceiver may include one or more communication interfaces to support communications with various devices (for example, user equipment, other base station and the like). Implementations of the transceiver are not limited herein.

For example, the generating unit 201 may indicate to disable the feedback mechanism of the HARQ process by setting the value of the first particular field to be a particular value. The particular value, for example, may be all '0's or all '1's. Alternatively, the particular value may be any other predetermined value. A rule that the feedback mechanism of the HARQ process is disabled when the first particular field takes the particular value may be written in the user equipment at the factory, so that the user equipment can determine that the feedback mechanism of the HARQ process is disabled when receiving the first particular field being equal to the particular value. Alternatively, the rule may be notified to the user equipment through RRC signaling, and an example is described below.

The generating unit 201 may be configured to determine the value of the first particular field, that is, determine whether to set the first particular field to be the particular value, based on at least one of: a Round-Trip Delay (RTD) between the base station and user equipment, service requirements, and data type. In a case that the RTD between the base station and the user equipment is large (for example, greater than a predetermined threshold), for example, in a case that the base station is a Geostationary Earth Orbit (GEO) satellite, the feedback mechanism of the HARQ process is disabled, that is, the first particular field is set to be the particular value. In a case that the base station is a Low Earth Orbit (LEO) satellite, the feedback mechanism of the HARQ process is enabled, that is, the first particular field is not set to be the particular value. For data requiring reliability not so high, the feedback mechanism of the HARQ process may be disabled. For data requiring high reliability, the feedback mechanism of the HARQ process may be enabled. In addition, for control plane data, the feedback mechanism of the HARQ process may be enabled. For example, for an initial access process, the feedback mechanism of the HARQ process is enabled, and the feedback mechanism of the HARQ process is disabled after the user equipment normally accesses into the system. It should be noted that HARQ blind transmission is still supported when the feedback mechanism of the HARQ process is disabled.

In a case that the first particular field is included in DCI for activation or release of the semi-static scheduling, the feedback mechanism of the HARQ process for semi-static scheduling data may be dynamically enabled or disabled.

As an example, the first particular field is a PDSCH-to-HARQ_feedback timing indicator.

The generating unit 201 may further be configured to reserve a state in a parameter dl-DataToUL-ACK in the RRC signaling for indicating that the feedback mechanism of the HARQ process is disabled when the first particular field is takes a particular value. That is, a rule for disabling the feedback mechanism of the HARQ process is notified to the user equipment through RRC signaling. As described in the first embodiment, the dl-DataToUL-ACK is a list of timing for transmitting ACK/NACK, and indicates timings of transmitting ACK/NACK feedback respectively corresponding to different values of the PDSCH-to-HARQ_feedback timing indicator. In the embodiment, a state is reserved in the dl-DataToUL-ACK and the PDSCH-to-HARQ_feedback timing indicator is mapped to the reserved state in a case that the PDSCH-to-HARQ_feedback timing indicator takes the particular value. Based on the reserved state, the user equipment determines that the feedback mechanism of the HARQ process is disabled. In a case that the PDSCH-to-HARQ_feedback timing indicator does not take the particular value, the PDSCH-to-HARQ_feedback timing indicator is mapped to other states of the di-DataToUL-ACK. Based on these states, the user equipment determines timing for transmitting ACK/NACK feedback. For an example, one may refer to FIG. 3 and the related description in the first embodiment.

In addition, the reserved state of the dl-DataToUL-ACK may further be used for indicating a reference value of the first particular field when the feedback mechanism of the HARQ process is enabled. The reference value is used for supplementing a meaning of the first particular field when the feedback mechanism of the HARQ process is enabled.

In a case that the first particular field is a PDSCH-to-HARQ_feedback timing indicator, the number of slots for feedback is calculated by adding the reference value to the number of slots to which the first particular field is mapped. For an example, one may refer to FIG. 4 and the related description in the first embodiment, and the example is not repeated herein. The reference value, for example, may be calculated based on a minimum distance for a satellite beam arriving at the ground, as shown in the previous equation (1).

Exemplarily, the generating unit 201 may further omit the first particular field or set the first particular field as a default value, and set the value of the reserved state of the dl-DataToUL-ACK to be 0 or less than a particular value so as to indicate disabling the feedback mechanism of the HARQ process. In this case, the feedback mechanism of the HARQ process may be semi-statically enabled or disabled through RRC signaling.

In another example, the DCI includes a combination of the first particular field and another particular field for indicating whether to disable the feedback mechanism of the HARQ process. For example, the first particular field is a PDSCH-to-HARQ_feedback timing indicator, and the other particular field may include one or more of: a PUCCH resource indicator and a TPC command for scheduled PUCCH.

In a case that the combination includes the PDSCH-to-HARQ_feedback timing indicator, the PUCCH resource indicator and the TPC command for scheduled PUCCH, for example, the generating unit 201 may indicate disabling the feedback mechanism of the HARQ process by setting values of the combination to be one of: a value of each field in the combination being all '0's; a value of each field in the combination being all '1's; each of values of some fields in the combination being all '0's, and each of values of the other fields in the combination being all '1's. It should be noted that the value settings described herein are only exemplary rather than restrictive.

By indicating whether the feedback mechanism of the HARQ process is disabled using the combination of fields, reliability can be further improved.

In the embodiment, dynamic enabling/disabling and/or semi-static enabling/disabling of the feedback mechanism of the HARQ process can be realized without additional signaling overhead, which improves control flexibility, thereby improving the system efficiency. In addition, with the solution according to the embodiment, HARQ blind transmission is supported when the feedback mechanism of the HARQ process is disabled, thereby ensuring the reliability of the system.

For ease of understanding, FIG. 6 shows a schematic diagram showing an example of an information procedure between a base station and user equipment in a case that the feedback mechanism of the HARQ process for dynamically scheduling data is dynamically enabled or disabled. As shown in FIG. 6, after user equipment (UE) initially accesses into a base station (BS), the base station may disable or enable an HARQ at data packet-level through a PDSCH-to-HARQ_feedback timing indicator field in DCI. In the example shown in FIG. 6, the BS, when transmitting a PDCCH scrambled by C-RNTI and a corresponding PDSCH #1 (the "corresponding PDSCH #1" refers to a PDSCH scheduled by the PDCCH through DCI, and the corresponding PDSCH below is similar), sets the PDSCH-to-HARQ_feedback timing indicator in the DCI to be all '0's. The UE decodes the PDCCH and the PDSCH #1 and determines that, based on a fact that the PDSCH-to-HARQ_feedback timing indicator is all '0's, a check result is not required to be fed back. Whether the UE is to perform CRC depends on specific implementation of the UE, which is not limited. Next, the BS, when transmitting a PDCCH scrambled by C-RNTI and a corresponding PDSCH #2, sets the PDSCH-to-HARQ_feedback timing indicator in the DCI to be other than all '0's. Similarly, the UE decodes the PDCCH and the PDSCH #2 and determines that, based on a fact that the PDSCH-to-HARQ_feedback timing indicator is other than all '0's, a check result is required to be fed back. For example, the UE feeds an NACK back to the BS based on a CRC result. The BS receives the NACK and transmits the PDSCH #2 again. The UE decodes again and performs the CRC. If the CRC result is correct, the UE feeds an ACK back to the BS. Subsequently, other data packet is transmitted.

Figure 7:
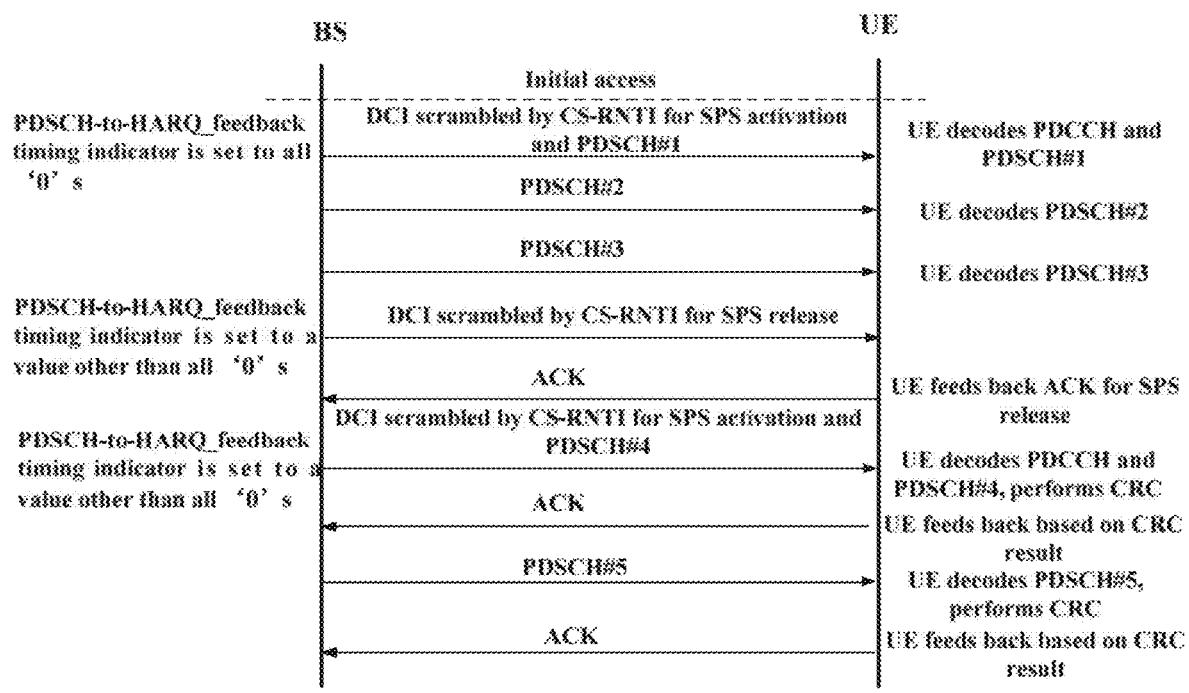
FIG. 7 shows another example of an information procedure between a base station and user equipment.

In addition, FIG. 7 shows a schematic diagram showing an example of an information procedure between a base station and user equipment in a case that a feedback mechanism of an HARQ process for semi-statically scheduling data is dynamically enabled/disabled. As shown in FIG. 7, after the UE initially accesses into the BS, the BS, when transmitting DCI scrambled by CS-RNTI and used for SPS activation and a corresponding PDSCH #1, sets the PDSCH-to-HARQ_feedback timing indicator in the DCI to be all '0's. The UE decodes the PDCCH and the PDSCH #1 and determines that a check result is not required to be fed back based on a fact that the PDSCH-to-HARQfeedback timing indicator is all '0's. Whether UE is to perform CRC UE depends on the specific implementation of the UE, which is not limited. Next, the BS continues to transmit SPS data PDSCH #2 and PDSCH #3. The PDSCH-to-HARQ_feedback timing indicator in the DCI for which SPS is activated is all '0's, a state of the feedback mechanism of the previous HARQ process is kept, and thus the UE does not perform ACK/NACK feedback for PDSCH #2 and PDSCH #3 either. Subsequently, the BS transmits DCI scrambled by CS-RNTI and used for SPS release and sets a PDSCH-to-HARQ_feedback timing indicator in the DCI to be other than all '0's. The UE feeds back an ACK for the SPS release according to the indication of the PDSCH-to-HARQ_feedback timing indicator. Next, the BS, when transmitting DCI scrambled by CS-RNTI and used for SPS activation and a corresponding PDSCH #4, sets a PDSCH-to-HARQ_feedback timing indicator in the DCI to be other than all '0's. The UE decodes the PDCCH and the PDSCH #4, and feeds back a check result based on a fact that the PDSCH-to-HARQ_feedback timing indicator is other than all '0's. Then the BS transmits PDSCH #5. The PDSCH-to-HARQ_feedback timing indicator in the DCI for which the SPS is activated is other than all '0's, and thus a state of the feedback mechanism of the previous HARQ process is kept. The UE feeds back a check result (an ACK in the example shown in FIG. 7) fir the PDSCH #5.

It should be noted that information procedures shown in FIGS. 6 and 7 are exemplary and do not limit the present disclosure.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 8:
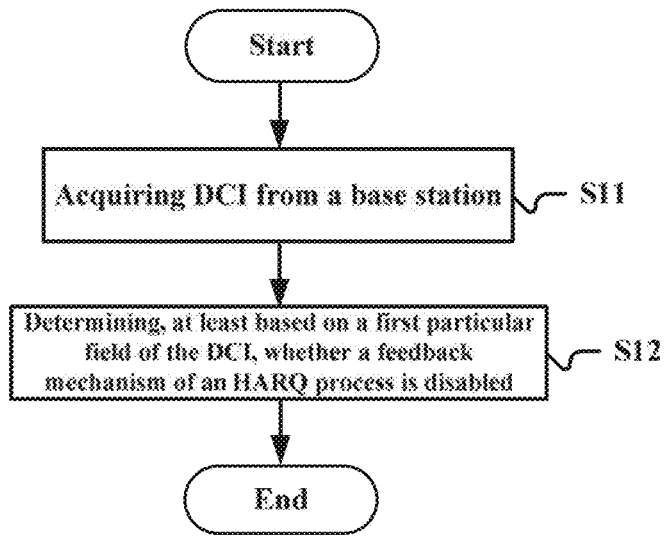
FIG. 8 is a flowchart of a method for wireless communications according to an embodiment of the present disclosure.

FIG. 8 is a flowchart of a method for wireless communications according to an embodiment of the present disclosure. The method includes: acquiring DCI from a base station (S11); and determining, at least based on a first particular field of the DCI, whether a feedback mechanism of a HARQ process is disabled (S12). In a case of determining that the feedback mechanism of the HARQ process is disabled, a check result for a data packet is not fed back to the base station.

In step S12, for example, in a case of determining that the first particular field takes a particular value, it is determined that the feedback mechanism of the HARQ process is disabled. The particular value, for examples, may be all '0's or all '1's, which is not limited. In step S12, a meaning of the first particular field may be parsed based on RRC signaling to perform the above determining. Alternatively, the meaning of the first particular field may be parsed based on factory settings.

For example, in step S12, the meaning of the first particular field may be determined based on a parameter dl-DataToUL-ACK in the RRC signaling. The dl-DataToUL-ACK reserves a state for indicating that the feedback mechanism of the HARQ process is disabled when the first particular field takes the particular value. In addition, the reserved state of the di-DataToUL-ACK is further used for indicating a reference value of the first particular field when the feedback mechanism of the HARQ process is enabled.

In a case that the first particular field does not exist or is default, whether the feedback mechanism of the HARQ process is disabled may be determined based on a value of is the reserved state of the dl-DataToUL-ACK. In a case that the value of the reserved state takes a value 0 or less than a particular value, it is determined that the feedback mechanism of the HARQ process is disabled.

As an example, the first particular field is a PDSCH-to-HARQ_feedback timing indicator.

In step S12, whether the feedback mechanism of the HARQ process is disabled may be determined based on a combination of the first particular field and another particular field. In a case of determining that a value of the combination meets a predetermined condition, it is determined that the feedback mechanism of the HARQ process is disabled.

For example, the first particular field is a PDSCH-to-HARQ_feedback tuning indicator, and the other particular field may include one or more of a PUCCH resource indicator and a TPC command for scheduled PUCCH. In a case that the combination includes the PDSCH-to-HARQ_feedback timing indicator, the PUCCH resource indicator and the TPC command for scheduled PUCCH, for example, the predetermined condition may include one of: a value of each field in the combination being all '0's; a value of each field in the combination being all '1's; each of values of some fields in the combination being all '0's, and each of values of the other fields in the combination being all '1's.

Figure 9:
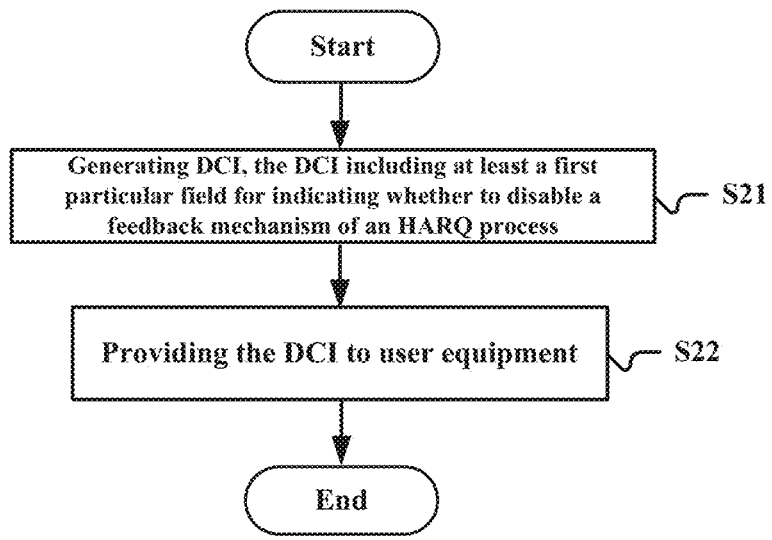
FIG. 9 is a flowchart of a method for wireless communications according to another embodiment of the present disclosure.

FIG. 9 is a flowchart of a method for wireless communications according to another embodiment of the present disclosure. The method includes: generating DCI, the DCI at least including a first particular field for indicating whether to disable a feedback mechanism of an HARQ process (S21); and providing the DCI to user equipment (S22). In a case of disabling the feedback mechanism of the HARQ process, the user equipment does not feed a check result for a data packet back to a base station.

In step S21, a value of the first particular field may be determined based on at least one of: a Round-Trip Delay between the base station and user equipment, service requirements, and data type.

For example, in step S21, disabling the feedback mechanism of the HARQ process may be indicated by setting the value of the first particular field to be a particular value. In addition, a state may be reserved in a parameter dl-DataToUL-ACK in the RRC signaling for indicating disabling the feedback mechanism of the HARQ process when the first particular field takes a particular value. The reserved state of dl-DataToUL-ACK may further be used for indicating a reference value of the first particular field when the feedback mechanism of the HARQ process is enabled.

The first particular field may be omitted or set to be a default value, and the value of the reserved state of the dl-DataToUL-ACK is set to be 0 or less than a particular value to indicate disabling the feedback mechanism of the HARQ process.

In addition, the DCI may include a combination of the first particular field and another particular field for indicating whether to disable the feedback mechanism of the HARQ process.

As an example, the first particular field may be a PDSCH-to-HARQ_feedback timing indicator, and the other particular field may include one or more of: a PUCCH resource indicator and a TPC command for scheduled PUCCH.

In step S21, disabling the feedback mechanism of the HARQ process may be indicated by setting values of the PDSCH-to-HARQ_feedback timing indicator, the PUCCH resource indicator and the TPC command for scheduled PUCCH to be one of: each of the values being all '0's, each of the values being all '1's, and each of some of the values being all '0's and each of the other of the values being all '1's.

The above methods respectively correspond to the device 100 described in the first embodiment and the device 200 described in the second embodiment. For details, one may refer to the description of the corresponding contents, and the details are not repeated herein. It should be noted that each of the above methods may be used in combination or separately.

The technology according to the present disclosure is applicable to various products.

For example, the electronic device 200 may be implemented as various base stations. The base station may be implemented as any type of evolved node B (eNB) or gNB (5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote wireless head ends (RRH) located at positions different from the main body. In addition, various types of user equipment may each serves as a base station by performing functions of the base station temporarily or semi-permanently.

The electronic device 100 may be implemented as various user equipments. The user equipment may be implemented as a mobile terminal (such as a smartphone, a tablet personal computer (PC), a notebook PC, a portable game terminal, a portable/dongle mobile router, and a digital camera) or a vehicle terminal (such as a vehicle navigation apparatus). The user equipment may also be implemented as a terminal that performs machine-to-machine (M2M) communication (also referred to as a machine type communication (MTC) terminal). Furthermore, the user equipment may be a wireless communication module (such as an integrated circuitry module including a single die) mounted on each of the terminals described above.

APPLICATION EXAMPLE REGARDING A BASE STATION

First Application Example

Figure 10:
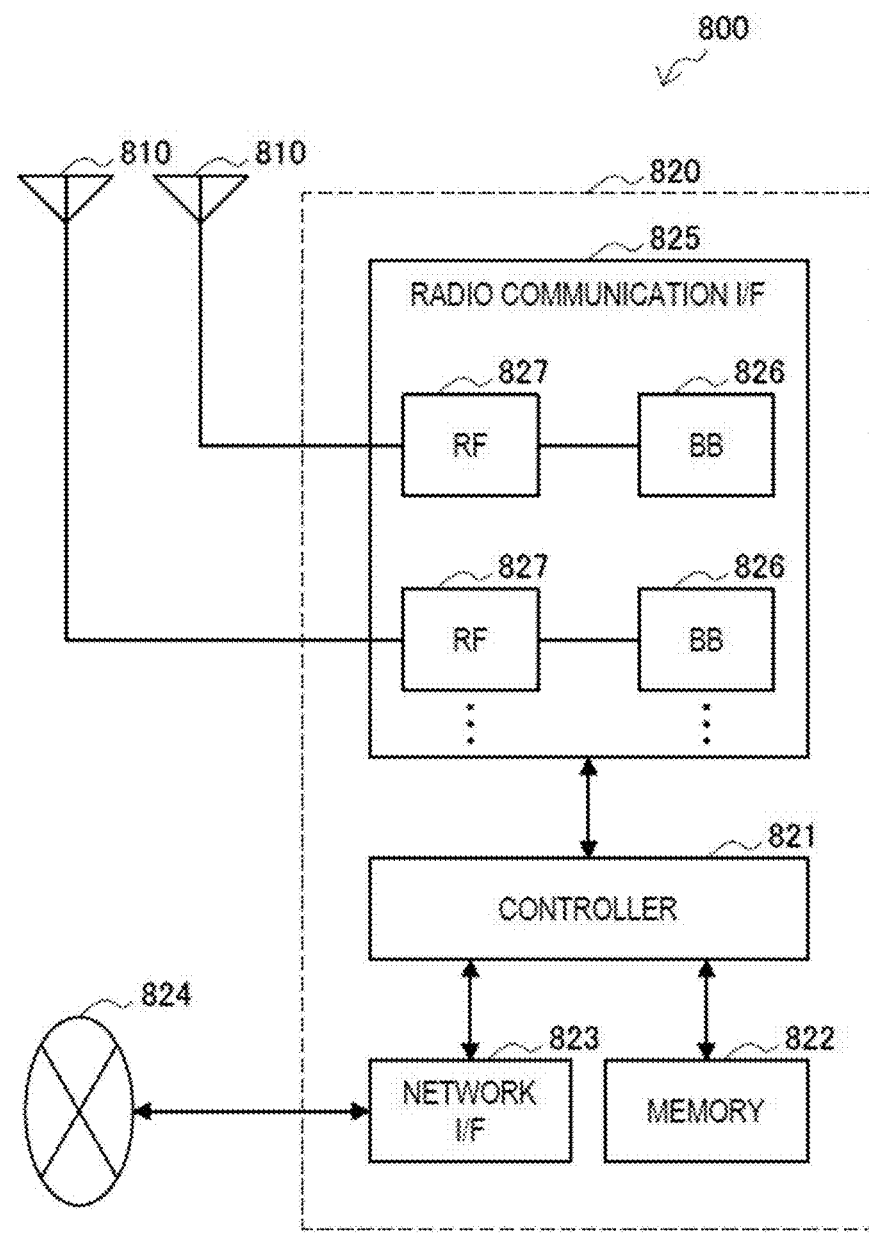
FIG. 10 is a block diagram showing a first example of an exemplary configuration of an eNB or gNB to which the technology according to the present disclosure may be applied.

FIG. 10 is a block diagram showing a first example of an exemplary configuration of an eNB or gNB to which technology according to the present disclosure may be applied.

It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 10, the eNB 800 may include the multiple antennas 810. For example, the multiple antennas 810 may be compatible with multiple frequency bands used by the eNB 800. Although FIG. 10 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base hand processors to generate the handled packet, and transfer the generated bundled packet. The controller 821 may have logical functions of performing control such as radio resource control, radio hearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface), The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LIE) and LTE-advanced), and provides wireless connection to a terminal located in a cell of the eNB 800 via the antenna 810. The radio communication interface 825 may typically include, for example, a baseband (BB) processor 826 and an RF circuit 827, The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data. Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 10, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 10. For example, the multiple RF circuits 827 may be compatible with multiple antenna elements. Although FIG. 10 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 10, a transceiver of the electronic device 200 may be implemented by the radio communication interface 825. At least a part of functions may also be implemented by the controller 821, For example, the controller 821 may dynamically enable or disable the feedback mechanism of the HARQ process by performing functions of the generating unit 201 and the providing unit 202.

Second Application Example

Figure 11:
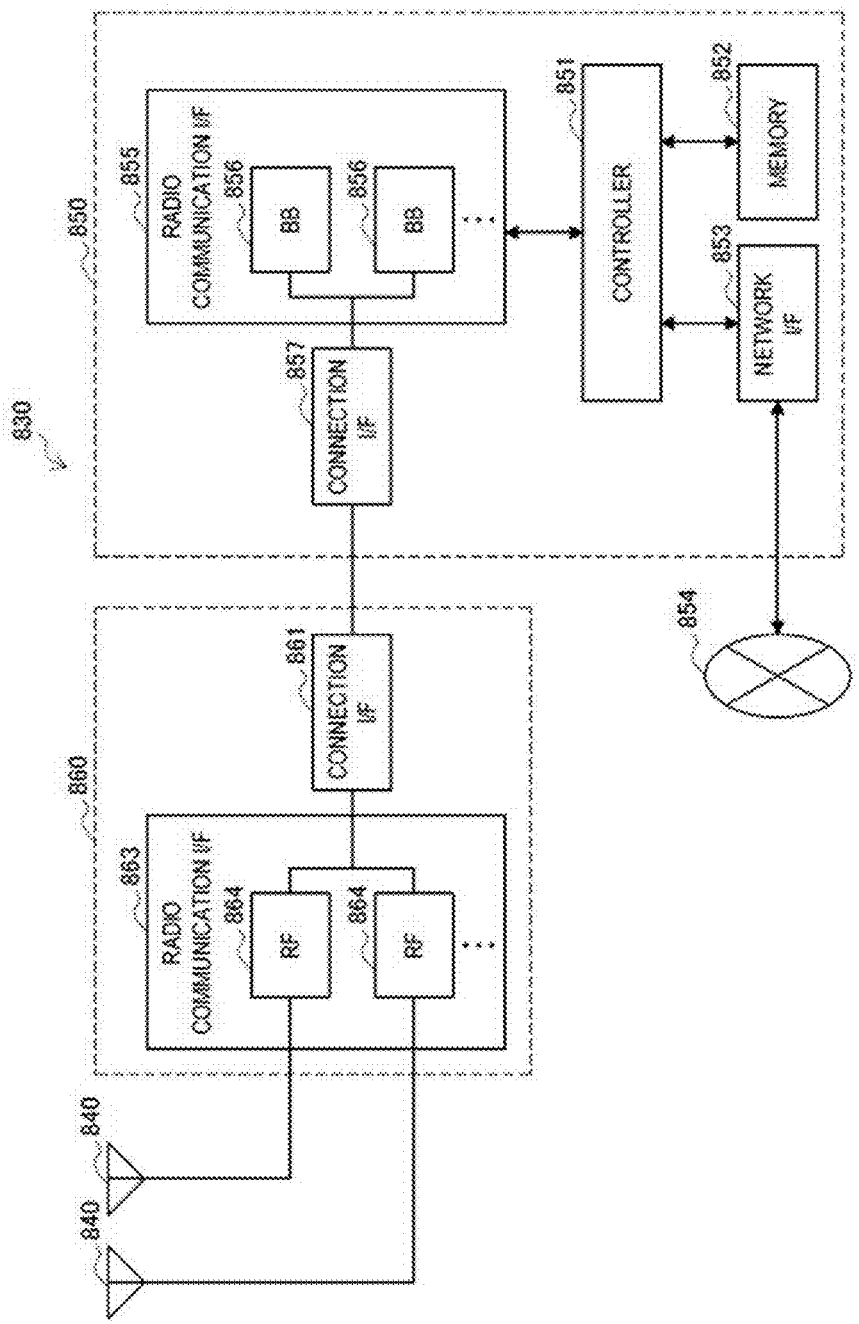
FIG. 11 is a block diagram showing a second example of an exemplary configuration of the eNB or gNB to which the technology according to the present disclosure may be applied.

FIG. 11 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 11, the eNB 830 may include the multiple antennas 840. For example, the multiple antennas 840 may be compatible with multiple frequency bands used by the eNB 830. Although FIG. 11 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 10.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 10, except that the BB processor 856 is connected to an RF circuit 864 of the RRH 860 via the connection interface 857. As show in FIG. 11, the radio communication interface 855 may include the multiple BB processors 856. For example, the multiple BB processors 856 may be compatible with multiple frequency bands used by the eNB 830. Although FIG. 11 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860, The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 11. For example, the multiple RF circuits 864 may support multiple antenna elements. Although FIG. 11 shows the example in which the radio communication interface 863 includes the multiple RF circuits 864, the radio communication interface 863 may also include a single RF circuit 864.

In the eNB 830 shown in FIG. 11, a transceiver of the electronic device 200 may be implemented by the radio communication interface 855 and/or the radio communication interface 863. At least a part of functions may also be implemented by the controller 851. For example, the controller 851 may dynamically enable or disable the feedback mechanism of the HARQ process by performing functions of the generating unit 201 and the providing unit 202.

APPLICATION EXAMPLE REGARDING USER EQUIPMENT

First Application Example

Figure 12:
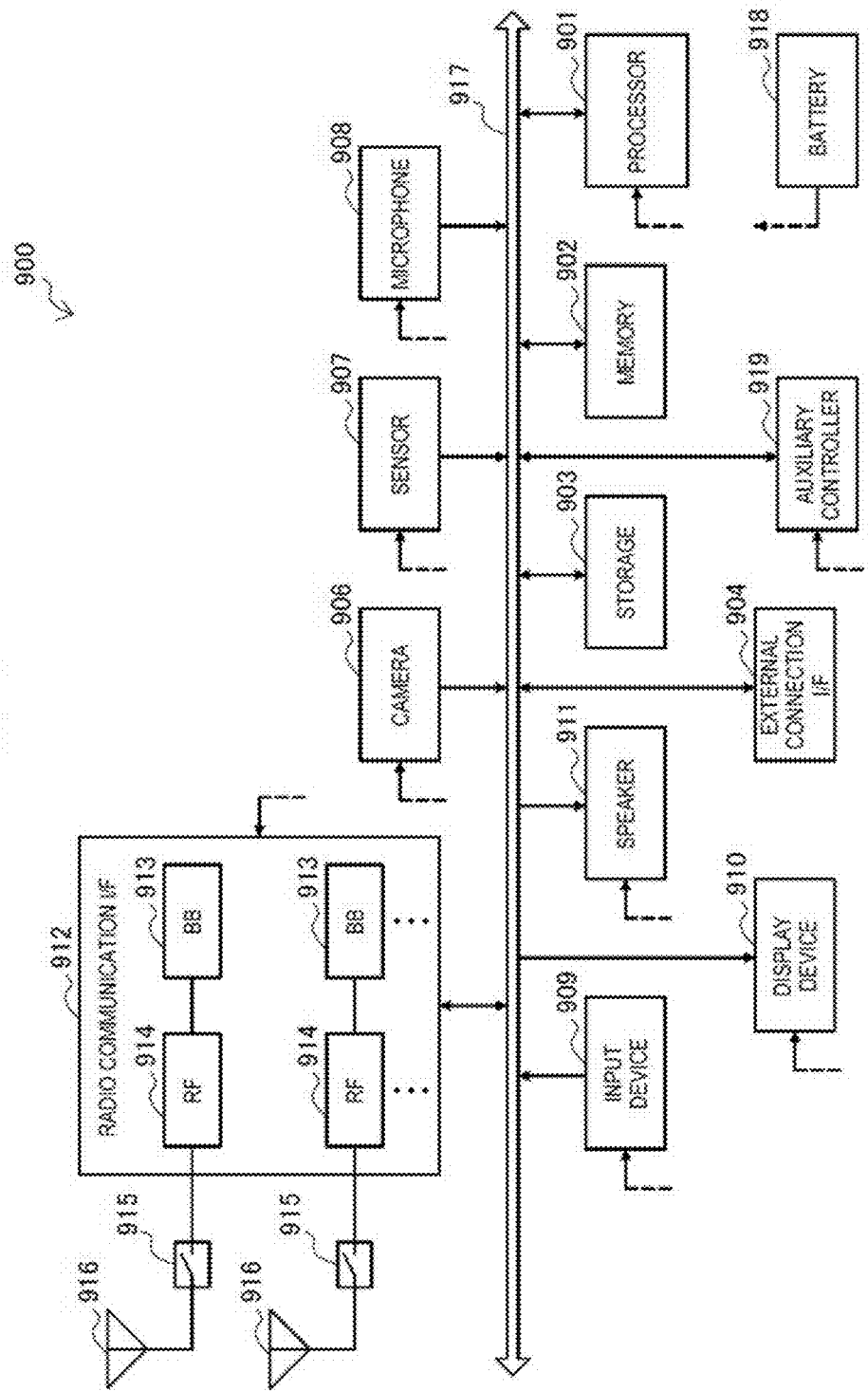
FIG. 12 is a block diagram showing an example of an exemplary configuration of a smartphone to which the technology according to the present disclosure may be applied.

FIG. 12 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 12 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 12. Although FIG. 12 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 12. Although FIG. 12 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 12 via feeder lines that are partially shown as dashed lines in FIG. 24. The auxiliary controller 919, operates a minimum necessary function of the smart phone 900, for example, in a sleep mode.

In the smartphone 900 shown in FIG. 12, a transceiver of the electronic device 100 may be implemented by the radio communication interface 912. At least a part of functions may also be implemented by the processor 901 or the auxiliary controller 919, For example, the processor 901 or the auxiliary controller 919 may dynamically enable or disable the feedback mechanism of the HARQ process by performing functions of the acquiring unit 101 and the determining unit 102.

Second Application Example

Figure 13:
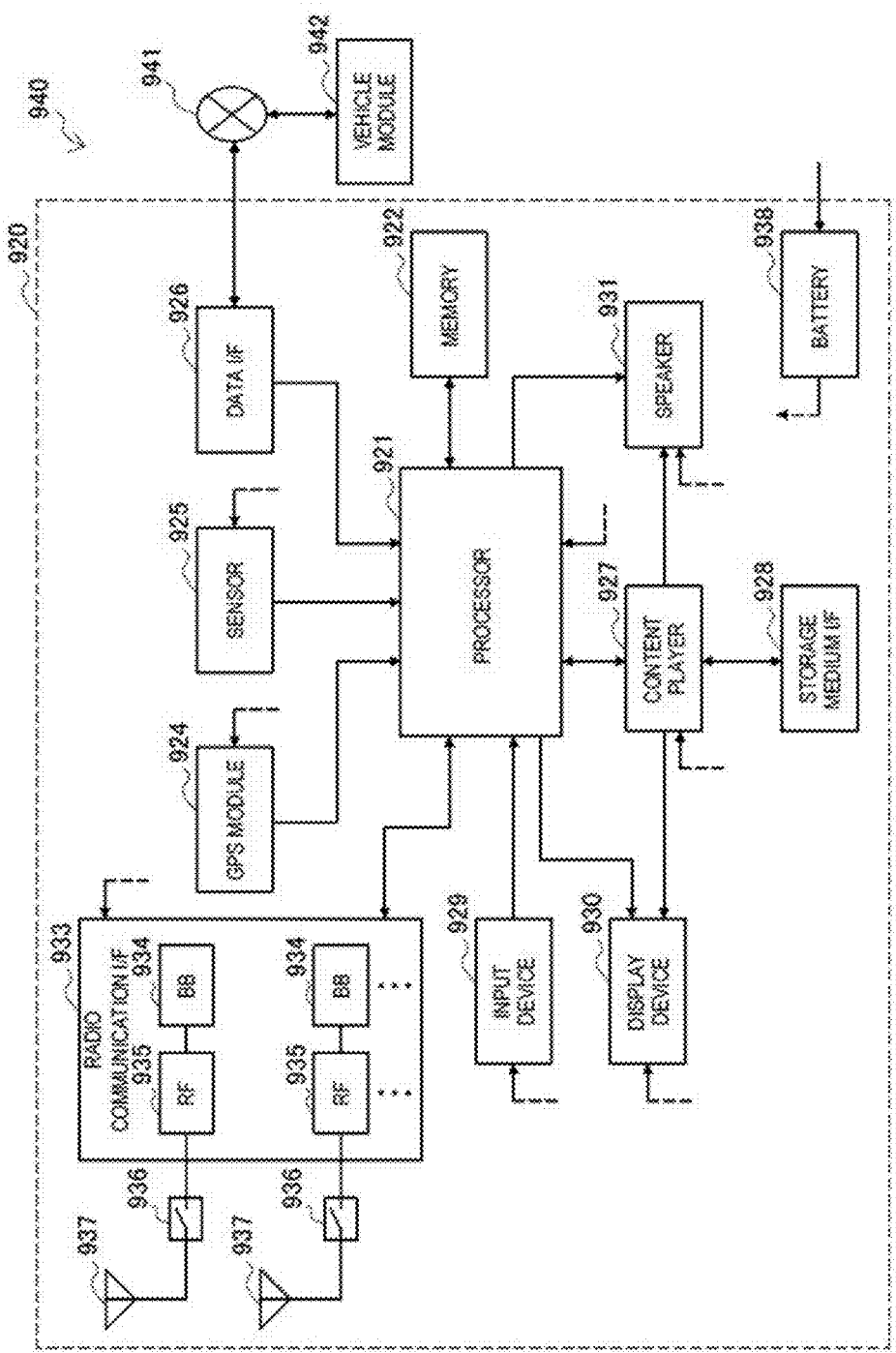
FIG. 13 is a block diagram showing an example of an exemplary configuration of a car navigation apparatus to which the technology according to the present disclosure may be applied.

FIG. 13 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a 1313 processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 13. Although FIG. 13 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 13, the car navigation apparatus 920 may include the multiple antennas 937. Although FIG. 13 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 13 via feeder lines that are partially shown as dash lines in FIG. 13. The battery 938 accumulates power supplied from the vehicle.

In the car navigation apparatus 920 shown in FIG. 13, a transceiver or a transmitting unit of the electronic device 100 may be implemented by the radio communication interface 933. At least a part of the functions may also be implemented by the processor 921. For example, the processor 921 may dynamically enable or disable the feedback mechanism of the HARQ process by performing functions of the acquiring unit 101 and the determining unit 102.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1400 shown in FIG. 14) from a storage medium or network, wherein the computer is capable of implementing various functions when installed with various programs.

Figure 14:
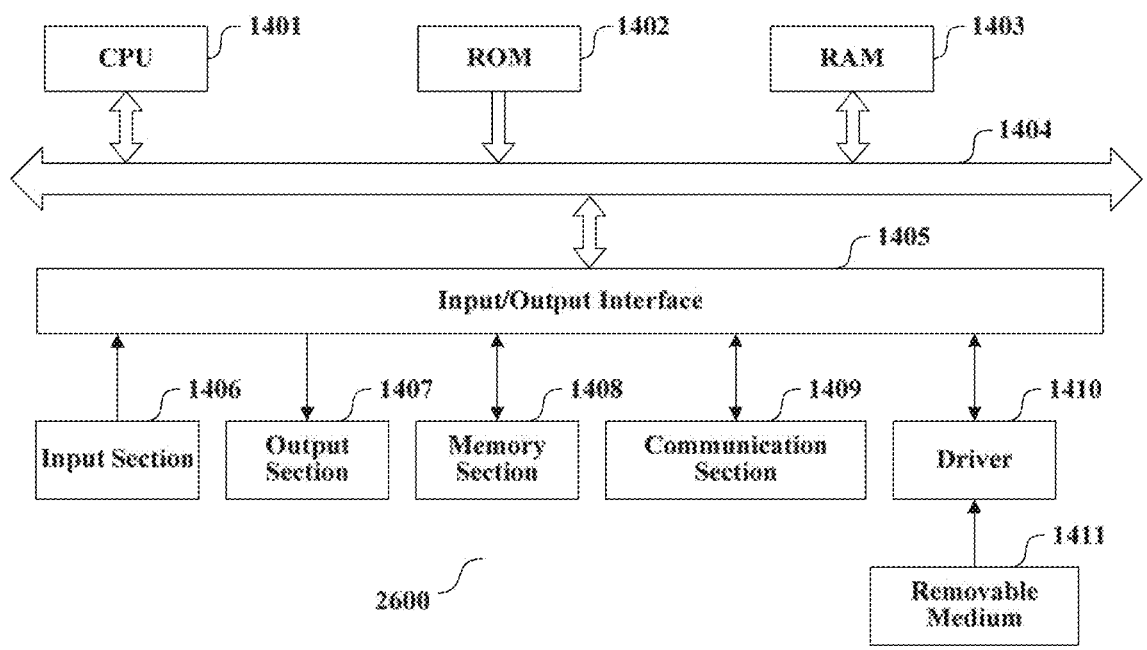
FIG. 14 is a block diagram of an exemplary block diagram illustrating the structure of a general purpose personal computer capable of realizing the method and/or device and/or system according to the embodiments of the present disclosure.

In FIG. 14, a central processing unit (CPU) 1401 executes various processing according to a program stored in a read-only memory (ROM) 1402 or a program loaded to a random access memory (RAM) 1403 from a memory section 1408. The data needed for the various processing of the CPU 1401 may be stored in the RAM 1403 as needed. The CPU 1401, the ROM 1402 and the RAM 1403 are linked with each other via a bus 1404. An input/output interface 1405 is also linked to the bus 1404.

The following components are linked to the input/output interface 1405: an input section 1406 (including keyboard, mouse and the like), an output section 1407 (including displays such as a cathode ray tube (CRT), a liquid crystal display (LCD), a loudspeaker and the like), a memory section 1408 (including hard disc and the like), and a communication section 1409 (including a network interface card such as a LAN card, modem and the like). The communication section 1409 performs communication processing via a network such as the Internet. A driver 1410 may also be linked to the input/output interface 1405, if needed. If needed, a removable medium 1411, for example, a magnetic disc, an optical disc, a magnetic optical disc, a semiconductor memory and the like, may be installed in the driver 1410, so that the computer program read therefrom is installed in the memory section 1408 as appropriate.

In the case where the foregoing series of processing is achieved through software, programs forming the software are installed from a network such as the Internet or a memory medium such as the removable medium 1411.

It should be appreciated by those skilled in the art that the memory medium is not limited to the removable medium 1411 shown in FIG. 14, which has program stored therein and is distributed separately from the apparatus so as to provide the programs to users. The removable medium 1411 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1402 and the memory section 1408 in which programs are stored, and can be distributed to users along with the device in which they are incorporated.

To be further noted, in the device, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n), . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic device for wireless communications, comprising:
   processing circuitry, configured to:
   acquire Downlink Control Information from a base station; and
   determine, at least based on a combination of a first particular field and another particular field of the DCI, whether a feedback mechanism of a Hybrid Automatic Repeat Request process is disabled,
   wherein, in a case of determining that the feedback mechanism of the Hybrid Automatic Repeat Request process is disabled, a check result for a data packet is not fed back to the base station,
   wherein, the processing circuitry is further configured to determine a meaning of the first particular field based on a parameter in radio resource control signaling,
   wherein, a state of the parameter is reserved for indicating that the feedback mechanism of the Hybrid Automatic Repeat Request process is disabled in a case that the combination takes a particular value,
   wherein, the processing circuitry is further configured to determine, based on a value of the reserved state of the parameter, whether the feedback mechanism of the Hybrid Automatic Repeat Request process is disabled, in a case of determining that the first particular field does not exist or is default,
   wherein, in a case that the value of the reserved state takes a value of 0 or less than a particular value, the processing circuitry determines that the feedback mechanism of the Hybrid Automatic Repeat Request process is disabled.

2. The electronic device according to claim 1, wherein, the processing circuitry is configured to determine that the feedback mechanism of the Hybrid Automatic Repeat Request process is disabled, when determining that a value of the combination meets a predetermined condition.

3. The electronic device according to claim 1, wherein, the processing circuitry is configured to determine that the feedback mechanism of the Hybrid Automatic Repeat Request process is disabled in a case that each of values of the first particular field and the other particular field is all '0's.

4. The electronic device according to claim 1, wherein, the reserved state of the parameter is further used for indicating a reference value of the first particular field when the feedback mechanism of the Hybrid Automatic Repeat Request process is enabled.

5. The electronic device according to claim 1, wherein, the first particular field is used for indicating HARQ feedback time.

6. The electronic device according to claim 5, wherein, the first particular field comprises a HARQ_feedback timing indicator.

7. The electronic device according to claim 1, wherein, the other particular field is used for indicating PUCCH resources.

8. The electronic device according to claim 7, wherein, the other particular filed comprises a PUCCH resource indicator.

9. The electronic device according to claim 1, wherein, the processing circuitry is further configured to parse a meaning of the first particular field based on radio resource control signaling, so as to perform the determining.

10. An electronic device for wireless communications, comprising:
    processing circuitry, configured to:
    generate Downlink Control Information, the Downlink Control Information at least comprising a combination of a first particular field and another particular field, for indicating whether to disable a feedback mechanism of a Hybrid Automatic Repeat Request process; and
    provide the Downlink Control Information to user equipment,
    wherein, in a case of disabling the feedback mechanism of the Hybrid Automatic Repeat Request process, the user equipment does not feed a check result for a data packet back to a base station,
    wherein, the processing circuitry is configured to reserve a state of a parameter in radio resource control signaling, for indicating disabling the feedback mechanism of the Hybrid Automatic Repeat Request process in a case that a value of the combination takes a particular value,
    wherein, the reserved state of the parameter is further used for indicating a reference value of the first particular field when the feedback mechanism of the Hybrid Automatic Repeat Request process is enabled,
    wherein, the processing circuitry is further configured to omit the first particular field or set the first particular field as a default value, and set the value of the reserved state of the parameter to be 0 or less than a particular value for indicating disabling the feedback mechanism of the Hybrid Automatic Repeat Request process.

11. The electronic device according to claim 10, wherein, the processing circuitry is configured to determine a value of the first particular field based on at least one of: a Round-Trip Delay between the base station and the user equipment, service requirements, and data type.

12. The electronic device according to claim 10, wherein, the first particular field is used for indicating HARQ feedback time.

13. The electronic device according to claim 10, wherein, the other particular field is used for indicating PUCCH resources.

14. A method for wireless communications, comprising:
    acquiring Downlink Control Information from a base station; and
    determining, at least based on a combination of a first particular field and another particular field of the Downlink Control Information, whether a feedback mechanism of a Hybrid Automatic Repeat Request process is disabled,
    wherein, in a case of determining that the feedback mechanism of the Hybrid Automatic Repeat Request process is disabled, a check result for a data packet is not fed back to the base station,
    wherein, the method further includes determining a meaning of the first particular field based on a parameter in radio resource control signaling,
    wherein, a state of the parameter is reserved for indicating that the feedback mechanism of the Hybrid Automatic Repeat Request process is disabled in a case that the combination takes a particular value,
    wherein, the method further includes determining, based on a value of the reserved state of the parameter, whether the feedback mechanism of the Hybrid Automatic Repeat Request process is disabled, in a case of determining that the first particular field does not exist or is default,
    wherein, in a case that the value of the reserved state takes a value of 0 or less than a particular value, the method further includes determining that the feedback mechanism of the Hybrid Automatic Repeat Request process is disabled.

* * * * *